(12) United States Patent
Channakeshava et al.

(10) Patent No.: US 8,225,383 B1
(45) Date of Patent: Jul. 17, 2012

(54) METHOD AND SYSTEM FOR USER-INITIATED ACCOUNT ACTIVATION

(75) Inventors: Girish Mallenahally Channakeshava, Bangalore (IN); Chandra B. S. Mohan, Bangalore (IN); Prakash Palanisamy, Erode (IN); Abhijit Pani, Bangalore (IN)

(73) Assignee: Intuit Inc., Mountain View, CA (US)

( * ) Notice: Subject to any disclaimer, the term of this patent is extended or adjusted under 35 U.S.C. 154(b) by 819 days.

(21) Appl. No.: 12/390,253

(22) Filed: Feb. 20, 2009

(51) Int. Cl.
*H04L 29/06* (2006.01)

(52) U.S. Cl. .......................................... 726/7

(58) Field of Classification Search ...................... 726/7
See application file for complete search history.

*Primary Examiner* — Jacob Lipman
(74) *Attorney, Agent, or Firm* — Park, Vaughan, Fleming & Dowler LLP; Chia-Hsin Suen

(57) ABSTRACT

Some embodiments provide a system that activates an online account. During operation, the system obtains, through a registration interface, authentication information for the online account from a user without obtaining contact information for the user through the registration interface. Next, the system generates an activation credential for the online account using the authentication information and displays the activation credential to the user through the registration interface. Finally, the system activates the online account upon receiving the activation credential from the user through user-initiated communications outside of the registration interface.

24 Claims, 4 Drawing Sheets

METHOD AND SYSTEM FOR USER-INITIATED ACCOUNT ACTIVATION

BACKGROUND

Related Art

The present embodiments relate to techniques for activating online accounts. More specifically, the present embodiments relate to a method and system for user-initiated activation of online accounts.

Online accounts are typically created and accessed by providing authentication credentials through a web-based user interface. For example, a user may create an online account on a social networking website by entering a login and password for the online account through a registration webpage in the social networking website. The login and password may subsequently be used by the social networking website both to verify the user's identity and to prevent unauthorized access to the online account by other users.

Online accounts may additionally require an activation process prior to use. In particular, the activation process may involve interaction with the user outside of the web-based user interface used to create the online account. For example, the user may be prompted for contact information such as a phone number and/or email address during online account registration. The user may then receive an activation code for the online account via the email address and/or phone number provided during registration. Finally, the user may activate the online account by entering the activation code into an activation webpage for the online account.

However, current activation methods for online accounts may include a number of drawbacks. First, contact information obtained during online account registration may be unreliable. For example, the user may accidentally misspell his/her email address during online account registration. Similarly, the user's email provider may not recognize the sender of the activation email and may mark the activation email as spam. As a result, the user may fail to receive the activation email for his/her online account, which may prevent the user from activating and/or using the online account.

Using contact information to activate online accounts may also pose a security risk. For example, an activation email sent to an incorrectly typed email address during online account registration may both fail to arrive at the correct email address and allow access to the online account through the incorrectly typed email address. Furthermore, activation emails may be intercepted and spoofed, thus potentially undermining the security of the user's email address and/or online account.

Hence, what is needed is a more reliable and secure activation process for online accounts.

SUMMARY

Some embodiments provide a system that activates an online account. During operation, the system obtains, through a registration interface, authentication information for the online account from a user without obtaining contact information for the user through the registration interface. Next, the system generates an activation credential for the online account using the authentication information and displays the activation credential to the user through the registration interface. Finally, the system activates the online account upon receiving the activation credential from the user through user-initiated communications outside of the registration interface.

In some embodiments, the system also prompts the user through the registration interface to provide the activation credential through the user-initiated communications.

In some embodiments, the system also creates the online account using the authentication information and the user-initiated communications.

In some embodiments, the user-initiated communications are provided using at least one of an email, a text message, a phone call, and an interactive voice response (IVR) command.

In some embodiments, the activation credential corresponds to at least one of a code, an image, and a file.

In some embodiments, the authentication information includes a login and a password.

In some embodiments, the registration interface corresponds to a web-based user interface.

In some embodiments, the online account is activated without sending communications to the user outside of the registration interface.

BRIEF DESCRIPTION OF THE FIGURES

In the figures, like reference numerals refer to the same figure elements.

DETAILED DESCRIPTION

Figure 1:
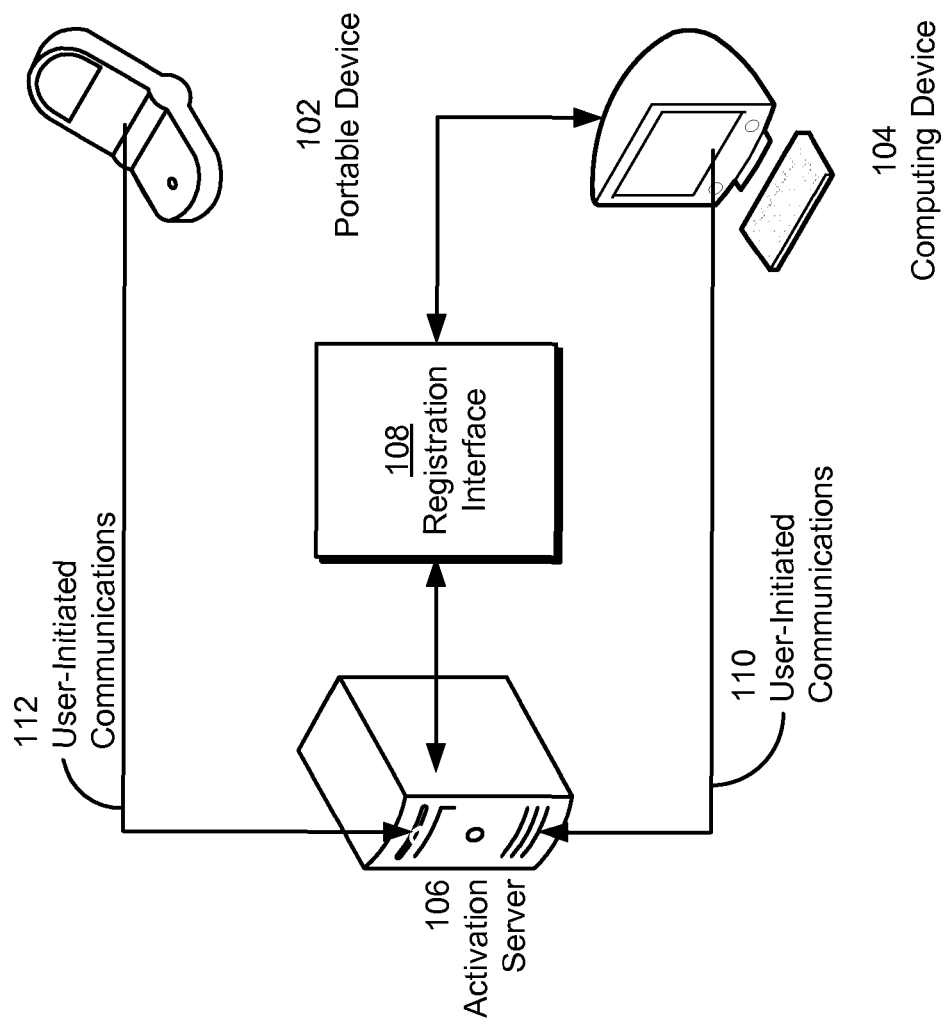
FIG. 1 shows a schematic of a system in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for activating an online account. The online account may be created through a web-based user interface from a computing device with network connectivity, such as a personal computer or laptop computer. In addition, the online account may be created using authentication information obtained from a user through the web-based user interface, such as a login and password. For example, the online account may be created by obtaining the login and password from the user through one or more webpages provided by a registration interface for the online account.

More specifically, embodiments provide a method and system for activating the online account. An activation credential may be generated using the authentication information obtained from the user. The activation credential may also be displayed to the user through the registration interface, along with a prompt for the user to provide the authentication credential through user-initiated communications outside of the registration interface. The online account may then be activated upon receiving the activation credential through the user-initiated communications. For example, the activation credential may be received as an activation code, image, and/or file from the user via email, text message, phone, and/or an interactive voice response (IVR) command.

FIG. 1 shows a schematic of a system in accordance with an embodiment. The system may be used to create and activate an online account, as described above. As shown in FIG. 1, the system includes a portable device 102, a computing device 104, an activation server 106, and a registration interface 108.

Activation server 106 may correspond to a software and/or hardware component that is used to create and/or activate the online account for the user. To create the online account, activation server 106 may obtain authentication information for the online account, such as a unique login and a password, from the user. The authentication information may subsequently be used to identify the online account and prevent unauthorized access to the online account by other users.

To obtain the authentication information, activation server 106 may provide a registration interface 108 through which the user may enter the authentication information. In one or more embodiments, registration interface 108 corresponds to a web-based user interface. As a result, the user may register for the online account using a web browser on computing device 104 (e.g., personal computer, laptop computer, etc.) and a network connection.

In particular, registration interface 108 may include one or more webpages that obtain the authentication information from the user and/or computing device 104 and transmit the authentication information to activation server 106. If the login is unique and/or the password includes a suitable character combination and/or length, activation server 106 may create an account using the login and password. Alternatively, activation server 106 may reserve the login and password for creation of the online account upon activation of the online account. If the activation fails or does not occur within a specified period (e.g., a week), the login may be released for use with a different online account by another user.

In one or more embodiments, activation server 106 allows for user-initiated activation of online accounts. Such user-initiated activation of online accounts may allow online accounts to be created and activated with greater reliability and/or security. More specifically, activation server 106 and/or registration interface 108 may differ from typical online account registration and/or activation methods by obtaining authentication information from the user without obtaining contact information from the user. In other words, registration interface 108 may not include fields for obtaining the user's email address, phone number, and/or other contact information that may be mistyped by the user and/or intercepted by malicious users. Online account registration is discussed in further detail below with respect to FIG. 2A.

Furthermore, because activation server 106 and/or registration interface 108 do not obtain contact information from the user during online account registration, activation server 106 may not initiate communications with the user outside of registration interface 108. In particular, activation server 106 may forgo bidirectional online account activation mechanisms outside of registration interface 108, such as the use of activation emails and/or text messages. By avoiding two-way communication with the user outside of registration interface 108, activation server 106 may minimize risks associated with delivery of activation emails (e.g., incorrectly typed email address during registration, spam filtering of activation emails) and/or online privacy and security (e.g., interception of activation emails, spoofing of activation emails).

Instead, activation server 106 may generate an activation credential for the online account using the login, password, and/or other authentication information for the online account obtained through registration interface 108. The activation credential may then be displayed to the user through registration interface 108 rather than sent to the user via phone, email, and/or another communications medium outside of registration interface 108. Activation server 106 may additionally prompt the user through registration interface 108 to provide the activation credential through user-initiated communications (e.g., user-initiated communications 110-112) outside of registration interface 108. Display of activation credentials and prompts for user-initiated communications are described in further detail below and with respect to FIG. 2B.

In one or more embodiments, the activation credential corresponds to a code, an image, and/or a file. For example, the activation credential may be provided to the user as a text-based activation code, an image containing the activation code, an activation token stored in a file, and/or other activation mechanism provided through registration interface 108. Furthermore, the prompt for user-initiated communications may instruct the user to email, text, and/or call with the activation credential to activate the online account.

As shown in FIG. 1, user-initiated communications 110-112 may occur from computing device 104 and/or portable device 102 (e.g., a mobile phone). In particular, the user may use either portable device 102 or computing device 104 to send the activation credential to activation server 106 using an email, text (e.g., Short Message Server (SMS)) message, phone call, and/or Interactive Voice Response (IVR) command. As a result, the user may choose the communications medium and/or device (e.g., portable device 102 or computing device 104) through which the online account is activated. For example, the user may send the activation credential through user-initiated communications 112 as a text message from portable device 102, or the user may send the activation credential through user-initiated communications 110 as an email from computing device 104.

Upon receiving user-initiated communications 110 or user-initiated communications 112, activation server 106 may create and activate the online account using the authentication information obtained through registration interface 108 and the user-initiated communications used to send the activation credential. For example, activation server 106 may store the email address and/or phone number used to send the activation credential as part of the online account. In other words, activation server 106 may obtain contact information associated with the online account through the user-initiated activation of the online account instead of through registration interface 108. In addition, user-initiated online account activation may allow activation server 106 to activate the online account without sending communications to the user outside of registration interface 108.

Figure 2A:
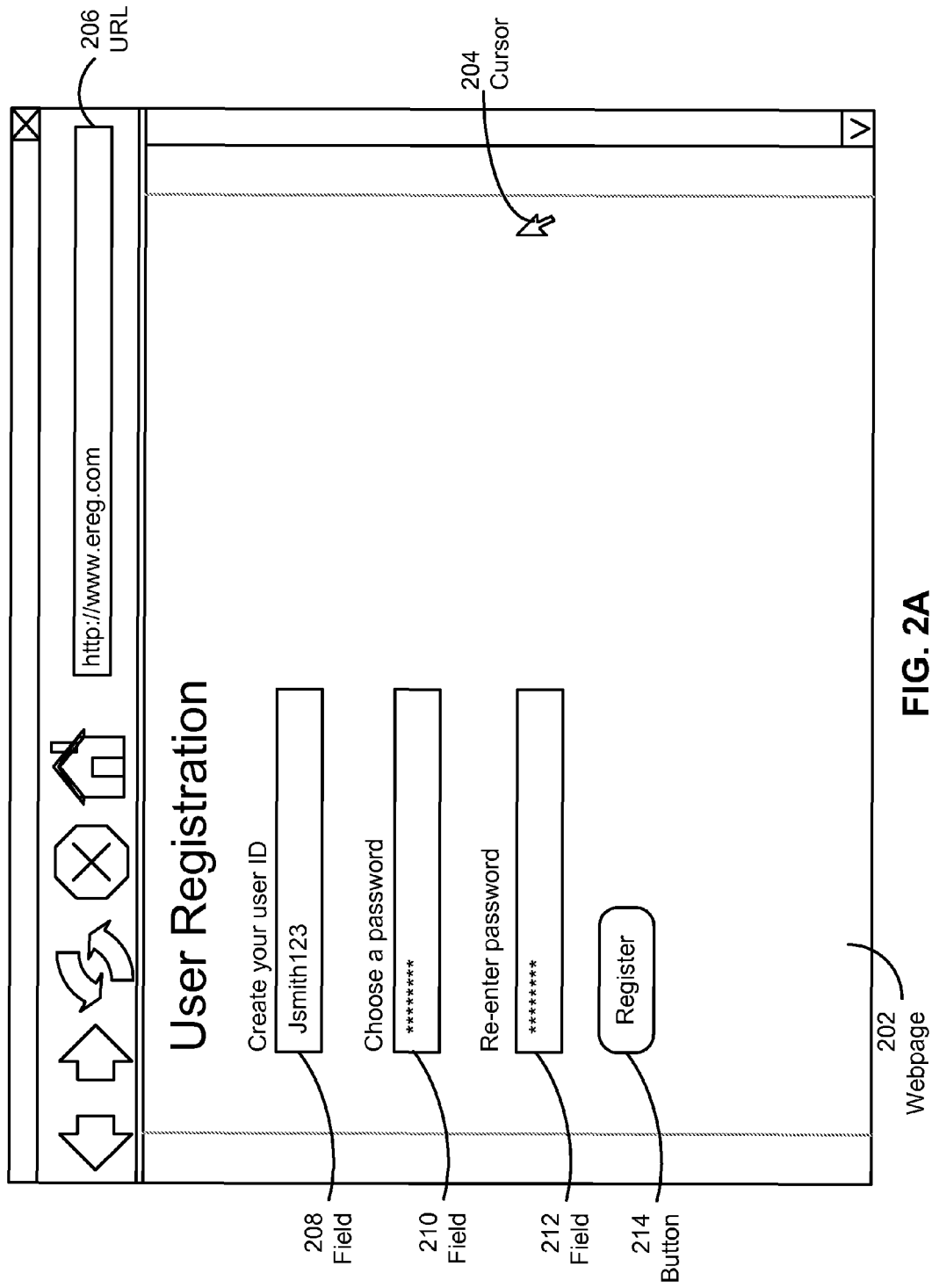
FIG. 2A shows an exemplary screenshot in accordance with an embodiment.

FIG. 2A shows an exemplary screenshot in accordance with an embodiment. More specifically, FIG. 2A shows a screenshot of a registration interface (e.g., registration interface 108 of FIG. 1) in accordance with an embodiment. As shown in FIG. 2A, the registration interface may correspond to a web-based user interface that is provided by a webpage 202 within a web browser. The web browser may be provided by a computing device, such as computing device 104 of FIG. 1. Furthermore, webpage 202 may be obtained from a Universal Resource Locator (URL) 206 by the web browser using a network connection available to the computing device.

In particular, webpage 202 may be supplied by the registration interface to obtain authentication information for an online account. The authentication information may be used to create and/or activate the online account, as described below.

Webpage 202 includes a set of fields 208-212 for obtaining the authentication information from a user. Field 208 (e.g., "Create your user ID") may be used to obtain a login (e.g., "Jsmith123") for the online account, field 210 (e.g., "Choose a password") may be used to obtain a password for the online account, and field 212 (e.g., "Re-enter password") may be used to confirm the password. The user may select each field 208-212 using a cursor 204 and/or a keyboard and enter relevant information into fields 208-212 using the keyboard. The user may then submit the authentication information to the registration interface by selecting a button 214 (e.g., "Register") on webpage 202 using cursor 204 and/or the keyboard. If field 208 contains an appropriate or unique login and fields 210-212 contain identical character combinations of suitable length and complexity, the login and password may be used to create the online account.

Furthermore, while fields 210-212 require a login and password for creating the online account, webpage 202 does not include fields for obtaining contact information from the user. In other words, webpage 202 does not request a phone number, email address, and/or other contact information from the user. Instead, the contact information may be obtained during user-initiated activation of the online account, as discussed below with respect to FIG. 2B. Online account registration through the user interface of FIG. 2A may thus avoid reliability and security issues associated with bidirectional communication with the user outside of the registration interface, as described above.

Figure 2B:
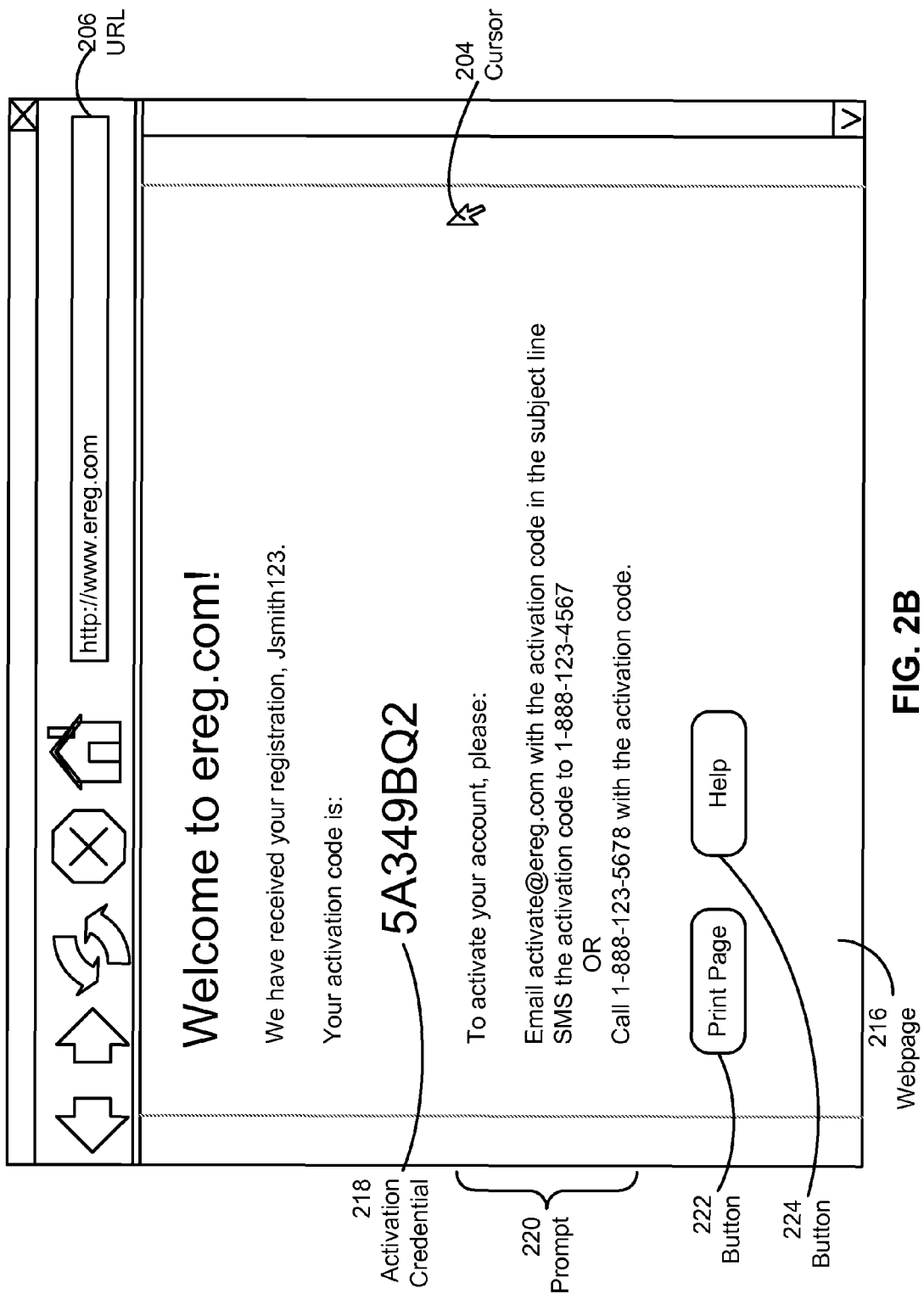
FIG. 2B shows an exemplary screenshot in accordance with an embodiment.

FIG. 2B shows an exemplary screenshot in accordance with an embodiment. More specifically, FIG. 2B shows the registration interface of FIG. 2A after the authentication information for the online account is submitted and accepted. Consequently, a new webpage 216 is displayed within the web browser. Furthermore, webpage 216 may allow the user to activate the online account through user-initiated communications.

In particular, webpage 216 includes an activation credential 218 for the online account corresponding to the login (e.g., "JSmith123") submitted in webpage 202. Activation credential 218 further corresponds to an activation code (e.g., "5A349BQ2") that the user must provide to activate the online account. Webpage 216 also includes a prompt 220 that includes instructions for activating the online account using activation credential 218. As shown in FIG. 2B, prompt 220 instructs the user to provide activation credential 218 via email (e.g., "Email activate@ereg.com with the activation code in the subject line"), text message (e.g., "SMS the activation code to 1-888-123-4567"), or phone/IVR (e.g., "Call 1-888-123-5678 with the activation code"). As a result, prompt 220 may request that the user provide activation credential 218 through user-initiated communications outside of the registration interface.

The user may select one of two buttons 222-224 using cursor 204 and/or the keyboard. Button 222 (e.g., "Print Page") may allow the user to print webpage 216 for record-keeping purposes. In other words, button 222 may provide the user with a hard copy of activation credential 218 and prompt 220 after the user navigates away from webpage 216 and/or closes the web browser. Button 224 (e.g., "Help") may provide the user with additional information regarding activation of the online account. For example, button 224 may navigate to a webpage that assists the user with providing activation credential 218 through user-initiated communications if the user finds prompt 220 unclear or difficult to understand.

Figure 3:
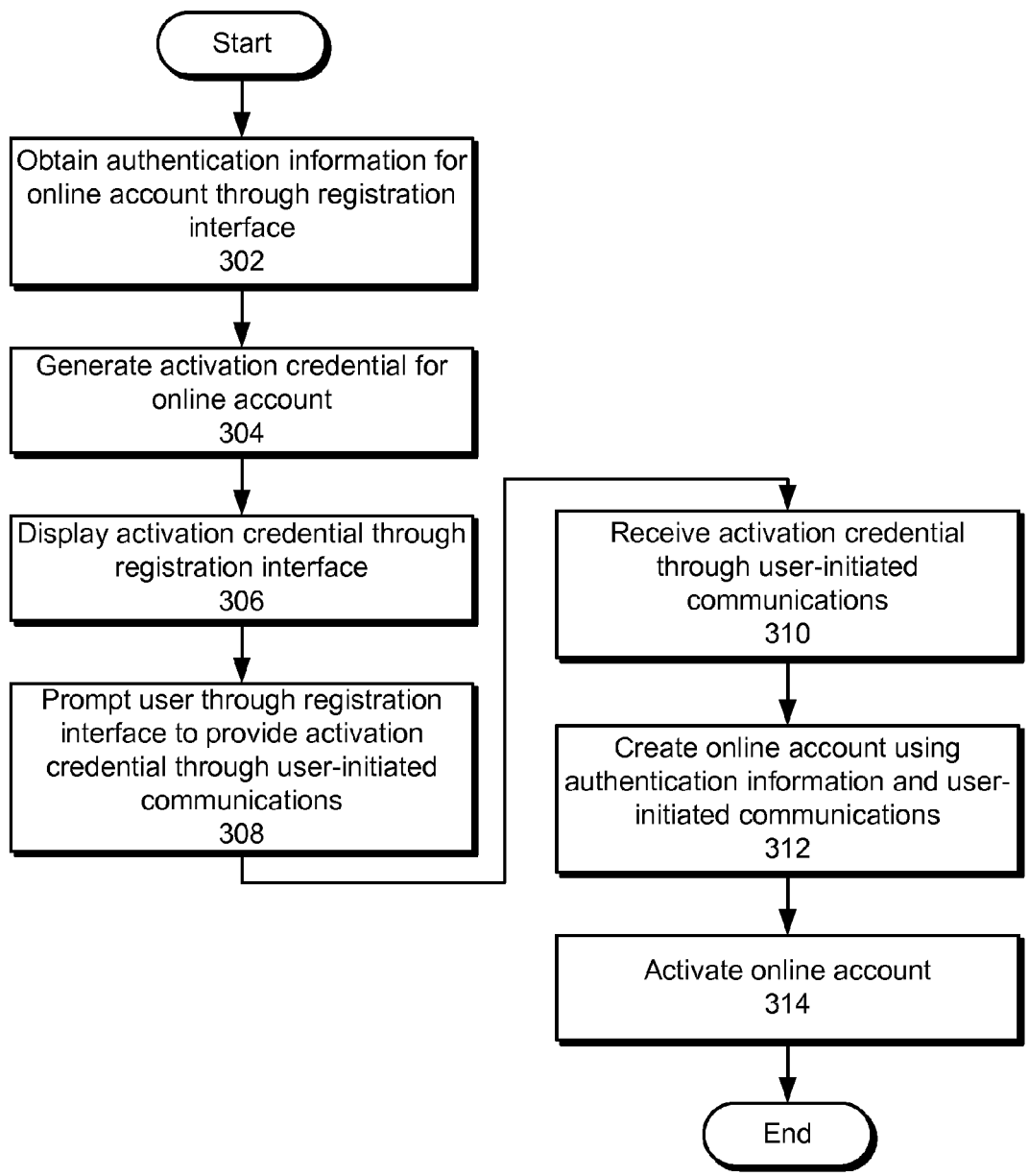
FIG. 3 shows a flowchart illustrating the process of activating an online account in accordance with an embodiment.

FIG. 3 shows a flowchart illustrating the process of activating an online account in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

Initially, authentication information for the online account is obtained through a registration interface for the online account (operation 302). The authentication information may include a login, password, and/or other authentication credentials used to identify and secure the online account for a user of the online account. Furthermore, the authentication information may be obtained from the registration interface without obtaining contact information, such as a phone number or email address, from the user.

Next, an activation credential for the online account is generated using the authentication information (operation 304). The activation credential may correspond to an activation code, image, and/or file used to activate the online account. Because the activation credential is generated using a unique combination of authentication information for the online account, the activation credential may also be used to identify the online account.

The activation credential is also displayed through the registration interface (operation 306). For example, the activation credential may be displayed as a text-based activation code, an image containing an activation code, and/or a downloadable activation token on a webpage provided by the registration interface. The registration interface may additionally include a prompt for the user to provide the activation credential through user-initiated communications (operation 308). As described above, the user-initiated communications may include email, text messaging, phone, and/or IVR. As a result, the prompt may contain instructions for providing the authentication credential via email, text message, phone, and/or IVR.

Next, the activation credential is received through the user-initiated communications (operation 310). Upon receiving the activation credential, the online account is created using the authentication information and the user-initiated communications (operation 312). For example, the online account may be identified using the authentication credential provided in the user-initiated communications. The online account may then be created using the login and password obtained through the registration interface and an email address obtained from the user-initiated communications. Finally, the online account is activated (operation 314) to allow subsequent use of the online account by the user. The user-initiated communications may thus function as a secure and reliable online account activation mechanism, as well as a means through which contact information for the online account may be obtained.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing a registration for an online account, comprising:
    obtaining, through a registration interface, authentication information for the online account from a user without obtaining contact information for the user through the registration interface;
    generating an activation credential for the online account using the authentication information;
    displaying the activation credential to the user through the registration interface; and
    activating the online account upon receiving the activation credential from the user through user-initiated communications outside of the registration interface.

2. The computer-implemented method of claim 1, further comprising:
    prompting the user through the registration interface to provide the activation credential through the user-initiated communications.

3. The computer-implemented method of claim 1, further comprising:
    creating the online account using the authentication information and the user-initiated communications.

4. The computer-implemented method of claim 1, wherein the user-initiated communications are provided using at least one of an email, a text message, a phone call, and an interactive voice response (IVR) command.

5. The computer-implemented method of claim 1, wherein the activation credential corresponds to at least one of a code, an image, and a file.

6. The computer-implemented method of claim 1, wherein the authentication information comprises a login and a password.

7. The computer-implemented method of claim 1, wherein the registration interface corresponds to a web-based user interface.

8. The computer-implemented method of claim 1, wherein the online account is activated without sending communications to the user outside of the registration interface.

9. A system for processing a registration for an online account, comprising:
    a registration interface configured to:
        obtain authentication information for the online account from a user without obtaining contact information for the user;
        generate an activation credential for the online account; and
        display the activation credential to the user; and
    an activation server configured to activate the online account upon receiving the activation credential from the user through user-initiated communications outside of the registration interface.

10. The system of claim 9, wherein the registration interface is further configured to:
    prompt the user to provide the activation credential through the user-initiated communications.

11. The system of claim 9, wherein the activation server is further configured to:
    create the online account using the authentication information and the user-initiated communications.

12. The system of claim 9, wherein the user-initiated communications are provided using at least one of an email, a text message, a phone call, and an interactive voice response (IVR) command.

13. The system of claim 9, wherein the activation credential corresponds to at least one of a code, an image, and a file.

14. The system of claim 9, wherein the authentication information comprises a login and a password.

15. The system of claim 9, wherein the registration interface corresponds to a web-based user interface.

16. The system of claim 9, wherein the online account is activated without sending communications to the user outside of the registration interface.

17. A computer-readable storage medium storing instructions that when executed by a computer cause the computer to perform a method for processing a registration for an online account, comprising:
    obtaining, through a registration interface, authentication information for the online account from a user without obtaining contact information for the user through the registration interface;
    generating an activation credential for the online account using the authentication information;
    displaying the activation credential to the user through the registration interface; and
    activating the online account upon receiving the activation credential from the user through user-initiated communications outside of the registration interface.

18. The computer-readable storage medium of claim 17, the method further comprising:
    prompting the user through the registration interface to provide the activation credential through the user-initiated communications.

19. The computer-readable storage medium of claim 17, wherein activating the online account involves:
    creating the online account using the authentication information and the user-initiated communications.

20. The computer-readable storage medium of claim 17, wherein the user-initiated communications are provided using at least one of an email, a text message, a phone call, and an interactive voice response (IVR) command.

21. The computer-readable storage medium of claim 17, wherein the activation credential corresponds to at least one of a code, an image, and a file.

22. The computer-readable storage medium of claim 17, wherein the authentication information comprises a login and a password.

23. The computer-readable storage medium of claim 17, wherein the registration interface corresponds to a web-based user interface.

24. The computer-readable storage medium of claim 17, wherein the online account is activated without sending communications to the user outside of the registration interface.

* * * * *